US005280426A

United States Patent [19]

Edmonds

[11] Patent Number: 5,280,426

[45] Date of Patent: Jan. 18, 1994

[54] COMPUTERIZED NETWORK FOR SUBSCRIBING/PURCHASING INTO GAMES OF CHANCE

[76] Inventor: C. Lawrence Edmonds, 42-15 43rd Ave., Sunnyside, N.Y. 11104

[21] Appl. No.: 485,461

[22] Filed: Feb. 27, 1990

[51] Int. Cl.$^5$ .............................................. G06F 15/20

[52] U.S. Cl. ...................................... 364/408; 364/401

[58] Field of Search ................ 364/408, 401, 410, 412

[56] References Cited

U.S. PATENT DOCUMENTS 4,882,473 11/1989 Bergeron et al. .................. 235/380

5,083,272 1/1992 Walker et al. ...................... 364/412

*Primary Examiner*—Roy N. Envall, Jr.

*Assistant Examiner*—Ari M. Bai

[57] ABSTRACT

A computerized system/network includes a central control unit which communicates with a player control unit operated by players or clients who wish to participate in or play a game of chance held in a region geographically remote for the player/client. The central control unit communicates with agent control units geographically located in the region where the game of chance to be participated in is played. Communication between the central control unit and player control unit is isolated from the agent control unit. Selected game play data is transmitted between the central control unit and the agent control unit. An agent located on-site where the game of chance is to be played purchases, holds and collects units of participation ordered by the central control unit, on order of the player/client. Game purchase funds and game winning funds are transferred between the central control unit and the agent.

7 Claims, 14 Drawing Sheets

RECEIVED
OCT 21 1993
GROUP 2500

COMPUTERIZED NETWORK FOR SUBSCRIBING/PURCHASING INTO GAMES OF CHANCE

BACKGROUND OF THE INVENTION

1. Field of the Invention

This invention relates to computer networks and systems and is essentially an electronic bulletin board or electronic trading system that advertises relevant data related to continuous offerings of subscription rights to 'Games of Chance.' The system does not solicit advice; offer guarantees; or intermediation between subscriber/purchaser and issuer or offerer.

At the present time some of the states of the United States of America; other authorized operators and countries foreign to the United States, issue or offer subscription or purchasing rights in the form of a complete Unit of Participation for each outstanding class of 'games of chance.'

The owner of record of one complete Unit of Participation in any class owns one right to a 'future claim' which when exercised on or within a prescribed expiration period after expiration of each class leads to a financial claim.

For the most part, these offerings are designed to enable public participation in any or all classes of offerings. Participation in any game of chance offered by a particular state in the U.S.; or other authorized operators; or in countries foreign to the U.S., can only be made within the state; or within the location where such offerings are available; or in the country foreign to the U.S. The offering of each class of Unit of Participation is closely supervised, so that the right to own one complete Unit of Participation in any class of offering is not available outside the state; or the location of the authorized operator; or the country that is foreign to the U.S.

This means that an individual or resident of California, who wishes to subscribe or purchase into any class of offering by the State of New York, or Florida, or any other authorized operator, or a country that is foreign to the U.S. must be personally and physically present within the State of New York or the State of Florida; or personally and physically present within the premises where these offerings are legitimately available; or in the country that is foreign to the U.S.; or alternatively establish private arrangements to be represented as a subscriber or purchaser. This of course has its drawbacks. Another problem with participating in any or all classes of offerings is that an owner or record of a complete 'right' leading to a 'future claim', must, for the most part furnish adequate proof that he or she is the beneficial owner of record of each complete Unit of Participation when submitting a 'right to claim' to the Issuer. A misplaced or lost Unit of Participation, which is only issued as a Bearer Certificate, could mean the loss of all rights to claim and thus the total loss of prize money. The inability of being able to be physically and personally present to subscribe or purchase into other classes of offerings of 'games of chance' is equally financially unrewarding.

SUMMARY OF THE INVENTION

The present invention is a computerized network, or essentially a programmed electronic bulletin board providing programmed information to individuals who wish to subscribe or purchase into any class of Unit of Participation in 'games of chance' offered by States; or any other authorized operator; or country foreign to the U.S.; whenever the subscriber or purchaser is physically and personally unable do so. From one aspect, the novel computer network provides a service, such as an agent or Master Nominee Trust service, enabling individuals to subscribe or purchase into Units of Participation in any class of game of chance offered by States other than the state in which the subscriber or purchaser is physically and primarily located; or offered by other legitimate operators; or offered in a country foreign to the U.S.

The present computerized network provides:

a) subscription or purchasing service for selected and qualified clientele;
b) security system ensuring integrity of the system;
c) an accounting of the service provided;
d) fulfills any subscription or purchasing obligation requested by clients by subscribing or purchasing into offerings of any class of Units of Participation offered within the state offering these Units; or by other legitimate operators; or in a country foreign to the U.S.;
e) securitization of each class of Unit of Participation which are issued in Bearer form.
f) holding each class of Units of Participation in Nominee Trust name on behalf of a particular person or persons;
g) automatic search for claim status on expiration date of each class of Unit of Participation;
h) automatic claim services; collection of claims for each class of Unit of Participation; followed by distribution of each settled claim to each holder of record.

The network includes a Central Control Unit (which may also be programmed to interact with the Master Nominee Trust) which communicates exclusively with the persons or clientele served by the network.

Upon communicating with the Central Control Unit. The client is identified; the client also indicates the class and choice of Units of Participation and the region or regions where the game in which the client wishes to participate in, is held. After the client data is received into the Central Control Unit and sorted by region, the information is transmitted in bulk form from the Master Nominee Trust Account to other appropriate Trustees of the Nominee Trust Accounts established and resident where games of chance of any class are offered. The transmission instructs the Trustee of the Nominee Trust to:

a) subscribe or purchase in bulk into any class of Unit of Participation ordered for the account of that designated Trust;
b) hold these subscriptions or purchases of any class of Unit of Participation in the account of the Nominee Trust until expiration;
c) acknowledge and confirm receipt of instructions and execution.

Subscriptions or purchases are made for the benefit of the client such that the Central Control Unit, the Master Nominee Trust, the designated Trustee and the Nominee Trust established and resident where games of chance are offered are effectively the agent of the client. However, it is to be noted that isolated contract between client and the Central Control Unit (master Nominee Trust) is made and isolated contact between the Central Control unit (Master Nominee Trust) and the designated Trustee and the Nominee Trust acting as the agent of the client is also made. That is, the respective contacts are isolated from each other although contact between the Central Control unit and all its designated subsidiaries are made for the benefit of the client who subscribes or purchases into offerings of any class of Unit of Participation.

DETAILED DESCRIPTION OF THE INVENTION

Figure 1:
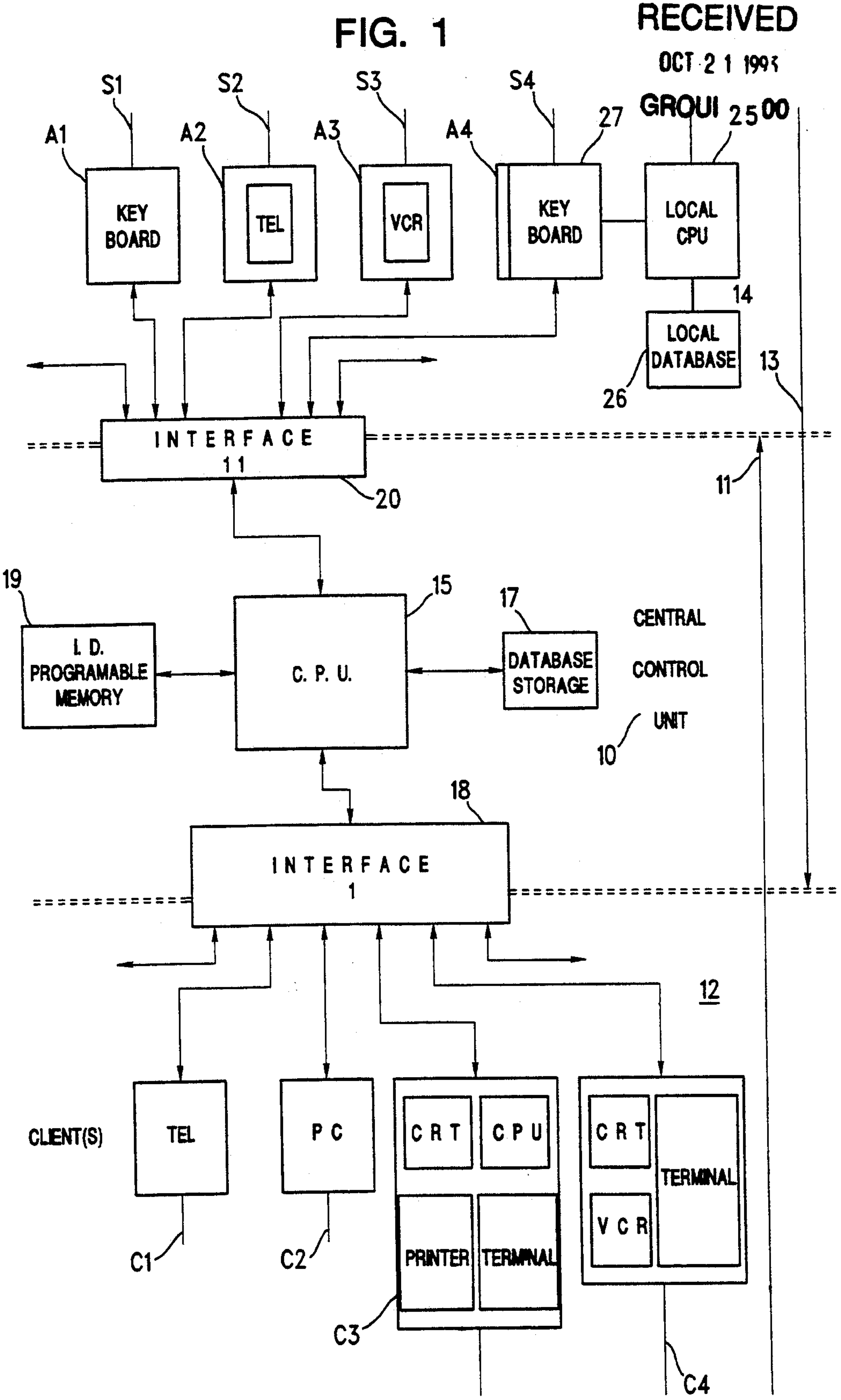
FIG. 1 is a block diagram representing apparatus ties communicatively together which may be used to practice the invention.

Referring to FIG. 1, a block diagram which represents apparatus set up in a network comprising three sections:

A Clients section; a Central Control section; an Agents Section is shown. The network is set up so that the Central Control Unit (#10) communicates with both the Clients section (#12) and the Agents section ((#14) but as represented by the arrow (#11) communication between a client in the clients section (#12) and the Central Control Unit ((#10) is isolated from the agents in the Agents section (#14) and, as represented by arrow ((#13), communication between any agent in the Agents section (#14) and the Central Control Unit (#10) is isolated from the clients section (#12).

The Central Control Unit of the management may include a computer having a central processing unit (#115 CPU) which may be controlled by software programs which essentially controls the functions or process of the computer. The data with which the computer functions may be retained on local databases in local programmable memory components such as discs; tapes or other storage or memory devices. The storage of such data is represented by the block ((#17) although the memory may include several programmable devices. Block ((#17) may also represent accounting data memory in which is stored a running account of a clients financial status, with respect to the network.

Communication between a client, which may be a person or individual, may be made to the Central Control unit by telephone, as represented by #C1, by Personal Computer, as represented by #C2, by a terminal, which may include a CPU, a cathode ray tube (CRT) and/or a printer, as represented by #C3, by a terminal which may include a CRT and/or a video cassette recorder (VCR), as represented by #C4 or any other well known method of communicating.

Communication between a client and the Central Control Unit is made through an interface, represented by block #18 interface #1 which feeds data into and receives data from the CPU #15.

Block #19, I.D. Programmable Memory is represented as a separate memory or storage although it could be a part of the storage, block #17. Such Programmable Memory may contain identification characteristics of clients or customers using the network or entitled to use the network.

It has been found that a reasonable security system, which protects not only the client but the network finance operation may include not only an entry card but also a personal identification number, a social security number may also be included in the identification protocol.

In order to ensure that funds are available with which to work, a deposit account representing a minimum balance, which is held in commingled trusteeship, may be continuously maintained by each client within the account of the network.

These various characteristics may be made part of the identification protocol which must be satisfied in order that a person wishing entry into the Central Control Unit may be granted initial entry.

The Storage #17 may include a storage of accounting data and data listing the regions where offerings of various classes of Units of Participation are offered and available. Accounting data, which is maintained on a client basis, may include a record of the funds on deposit for any particular client, and is maintained on a client basis.

Accounting may also include a subscription or purchasing history of each class of Unit of participation ordered and funds expended; claims submitted; and claims settled and credited on a client basis. This data may be made available to the client periodically or at the request of the client; and to the Internal Revenue Service, thus making the network I.R.S. friendly.

The storage #17 may further include data describing several or all classes of Units of Participation data, that is, Units of Participation offered and available for subscription or purchase. This data may be displayed or otherwise transmitted to a client at the request of the client.

The history of subscription or purchases into any class of Units of Participation, on a client basis may include a listing of past subscriptions into any or all classes of Units of Participation and a listing of subscriptions or purchases that remain open and due to expire.

The Units of Participation available for subscription or purchase may be arranged in a series of classes; on an alphabetical; regional basis; or series of classes arranged in alphabetical order and may include the date and time of each class of offering and expiration and similar information on the next available class or series.

When communication between a client and the Central Control Unit is completed and the subscription or purchase requested by the client has been recorded in the name of the client within the Central Control Unit, communication between the Central Control Unit and one or more Trustees and Nominee Trusts may be established for the benefit of transmitting the quantity; identification of region and class where the Unit of Participation is offered.

Thus, the procedure enables the appropriate nominated agent to subscribe or purchase into the class of Unit of Participation for the benefit of the client.

Funds, representing settlement costs for each class of Unit of Preparation are simultaneously transferred by a Funds transfer order originating from the Master Nominee Trustee to the Master Nominee Bank who instructs the Regional Nominee Trustee to credit the account of the Trustee Bank representing the issuer of each class of Unit of Precipitation or to pay the issuer directly.

It is within this protocol that the nominated agent performs the role of subscribing or purchasing into any class of Unit of Participation offered by a particular state in the U.S., or other authorized operators, or in a country foreign to the U.S., but solely for the benefit of the client of record. Data of the subscriptions or purchases ordered, that is the total number of subscriptions or purchases ordered and any other details are transferred from the nominated agent, after having receiving confirmation of such data from the issuer, to the Central Control Unit, where the master subscription or purchase data file is stored.

Each region, where there are one or more classes of Unit of Participation available and offered may have one or more nominated agents of the network physically domiciled within the region, who, as Nominee Agent for the network enters subscription or purchase orders in bulk into each class of Unit of Participation in the region for the benefit of each client.

The nominated agent also keeps track of winning combinations of each class of Unit of Participation; and on expiration if there are any Units of Participation with an outstanding and unexpired right to claim feature attached, it is the responsibility of the nominated agent to submit such unexpired claims to the Issuer for redemption; and on settlement of each claim, credit the redeemed funds due from such claims to the account of the Master Nomine Trust for distribution to holders of record.

Agent #A1 may include one or more agents who are nominated and located in each region where subscription rights to complete Units of Participation in any class are offered and available.

Games of chance in any class of Unit of Participation which include selecting a combination of numbers from a group of limited numbers may be currently offered in the State of New York, or in the State of New Jersey, or in the State of Florida, or even offered by other legitimate operators; or even countries foreign to the United States of America may also have available classes of offerings that may be subscribed or purchased into.

Although four designated agents are represented-:—#A1, A2, A3, and A4; with each agent associated and domiciled within a specified region: #'s S1, S2, S3, and S4 respectively; each agent may represent more than one agent and there may be more than four agents and/or more than four specific regions involved in the network. Block #20, Interface 11 represents an interface between the Central Control Unit and the Agents. The Central Control Unit may communicate with any agent in the group of Agents, through Interface 11, to the exclusion of the clients in the group of clients. This isolation is represented by arrow #13.

A local agent or on-site agent may have and/or include its own computer, represented by Block #25, local CPU and a storage for its own local database, Block #26. A terminal, #27 may be used to communicate with the Central Control Unit through interface #11, Block #20.

Other means of communicating between a local agent and the Central Control Unit may be used, for example—such as telephone; represented by Block #A2, VCR, represented by Block #A3 and other terminal means, represented by Block #A1.

It will be appreciated that the Central Control Unit Database Storage, Block #17 may be used to store data from the client as well as from the agent. Comparison of data for accuracy is within the state of the art.

Figure 2:
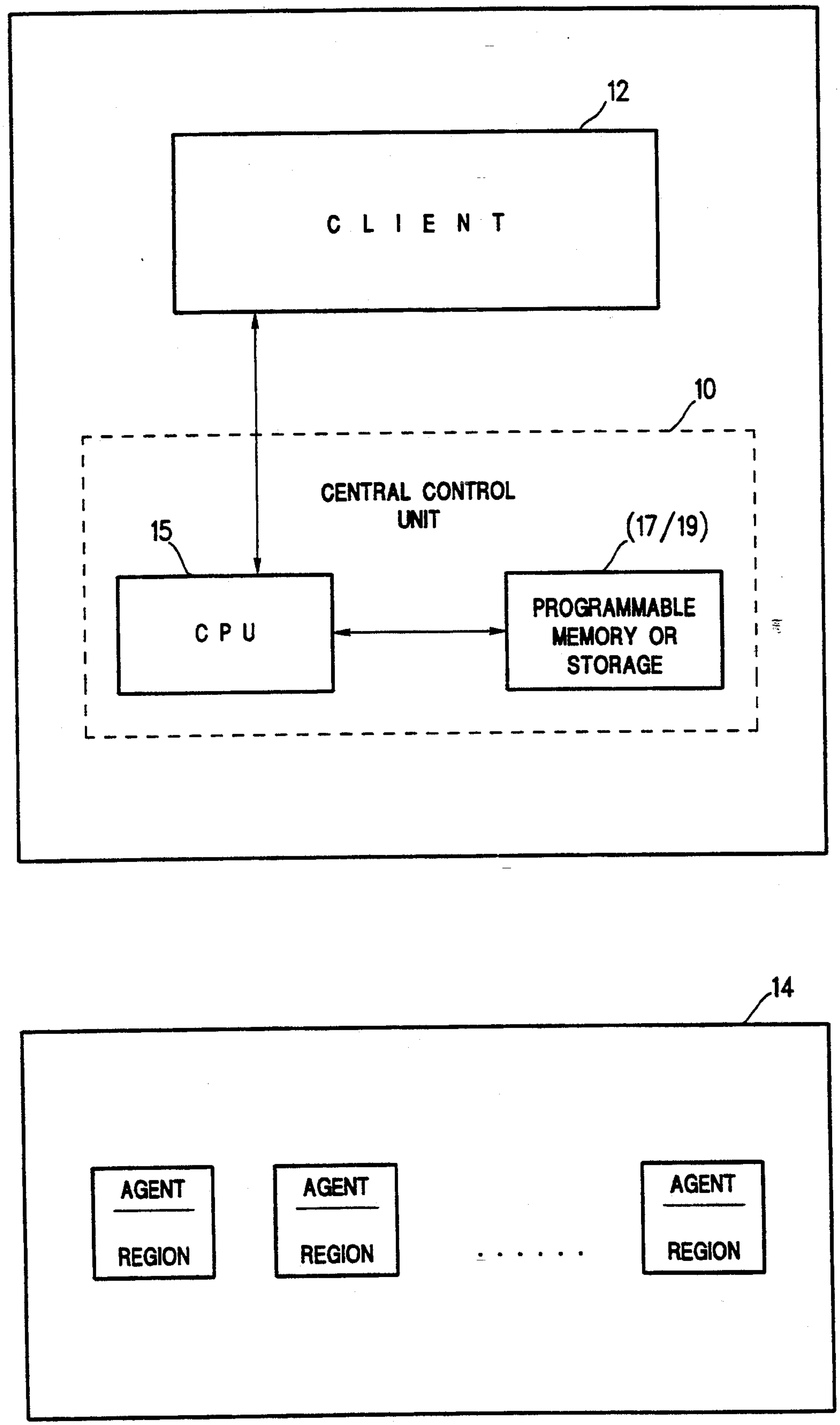
FIG. 2 is a block diagram representing communication flow in the network in the Unit of Participation subscription mode.

FIG. 2 is a block diagram representing the communication flow during the Unit of Participation subscription or purchase request protocol. In this protocol, identification of the client is established. The client and Central Control Unit communication is isolated from the agents in the network.

Figure 3:
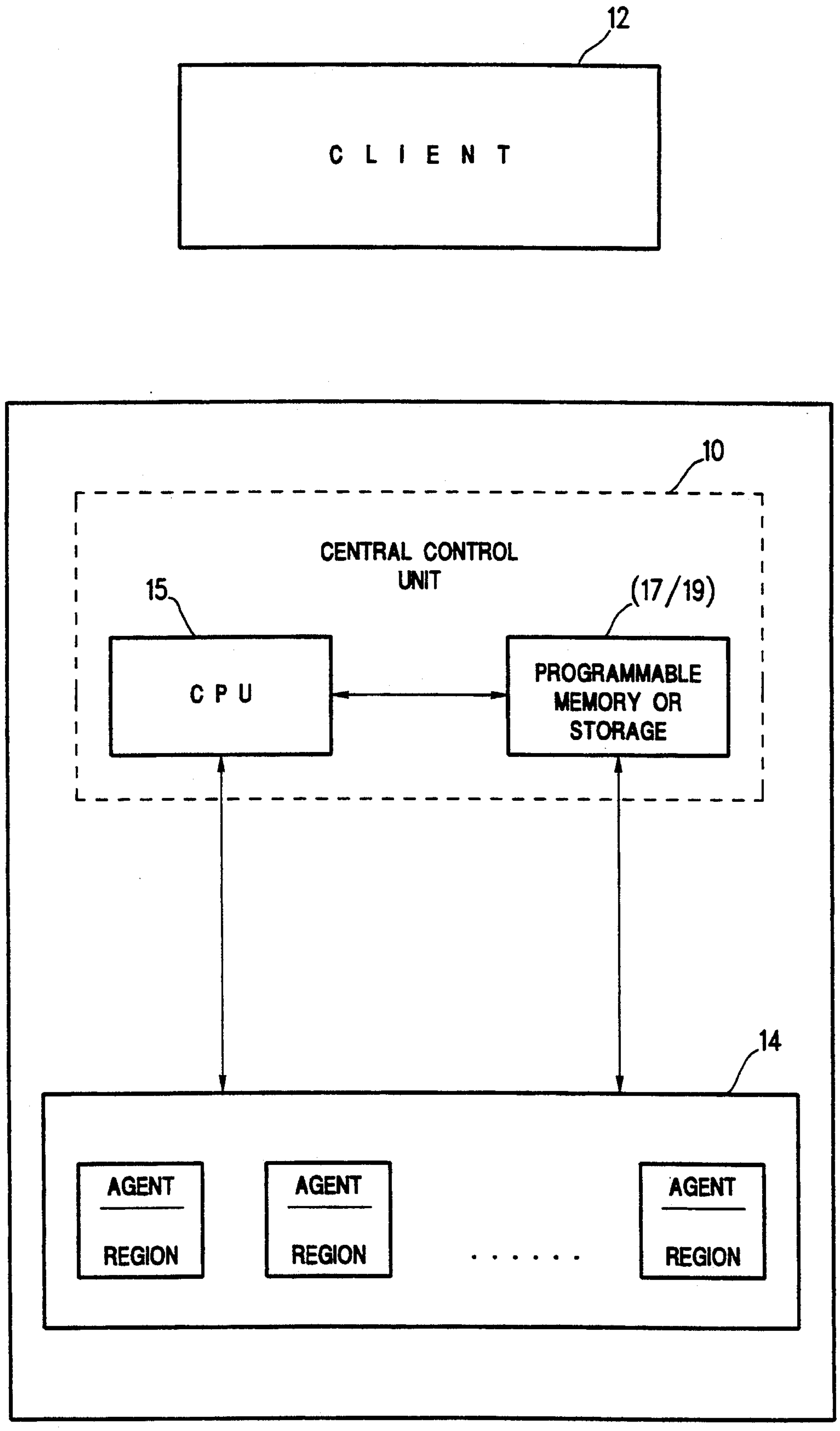
FIG. 3 is a block diagram representing communication flow in the network in the Unit of Participation registration mode.

FIG. 3 is a block diagram which represents communication flow in the network during the class of Unit of Participation registration protocol, which occurs between the Central Control Unit and one or more nominated agents in the Agents division of the network. This communication is isolated from the clients in the Clients division of the network.

Communication between a nominated agent and the issuer offering subscription rights to purchase any class of Unit of Participation is not considered to be part of the network. The issuer is the only party from which subscription rights to purchase any class of Unit of Participation or other materials may be obtained enabling the subscriber or purchaser of the network to participate in the offerings.

Figure 4:
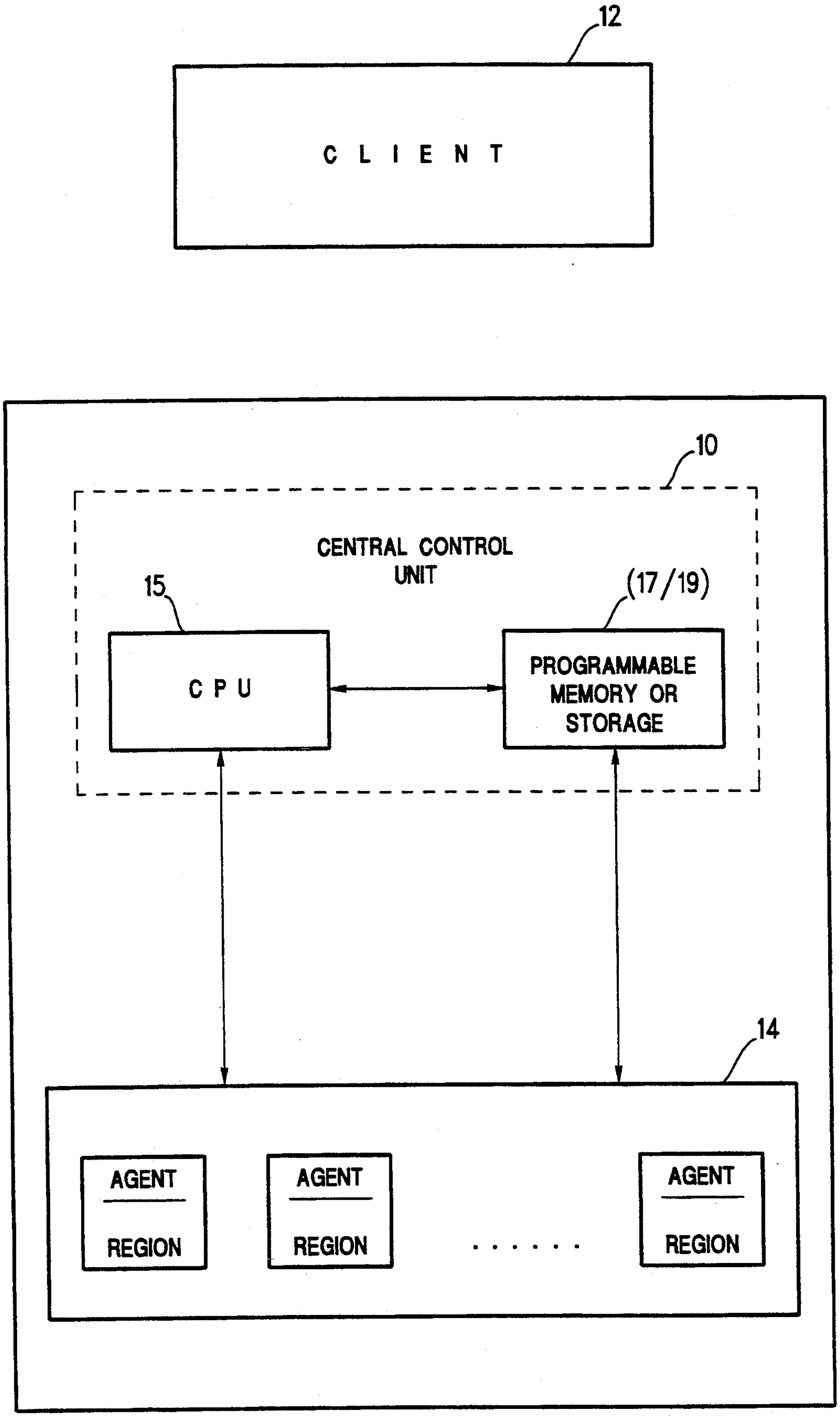
FIG. 4 is a block diagram representing communication flow in the network in the Unit of Participation subscription settlement mode.

FIG. 4 is a block diagram which represents communication flow in the network during the subscription payoff protocol. Transfer of data from agents who were authorized to subscribe into each class of Unit of Participation; and who were authorized to submit valid rights to claim on each class of Unit of Participation on or before expiration of the right to claim; and who received payment of each class of right to claim; flows from each particular agent to the Central Control Unit. With such information or data the accounting storage information bank may be updated.

The Central Control Unit may include a Nominee Bank or other Nominee financial institution established or nominated to hold and/or account for money and established or nominated to make the transactions required by the protocol followed by the Central Control Unit.

It will be appreciated that a program may be used to direct the communication into and from the Central Control Unit.

Figure 5:
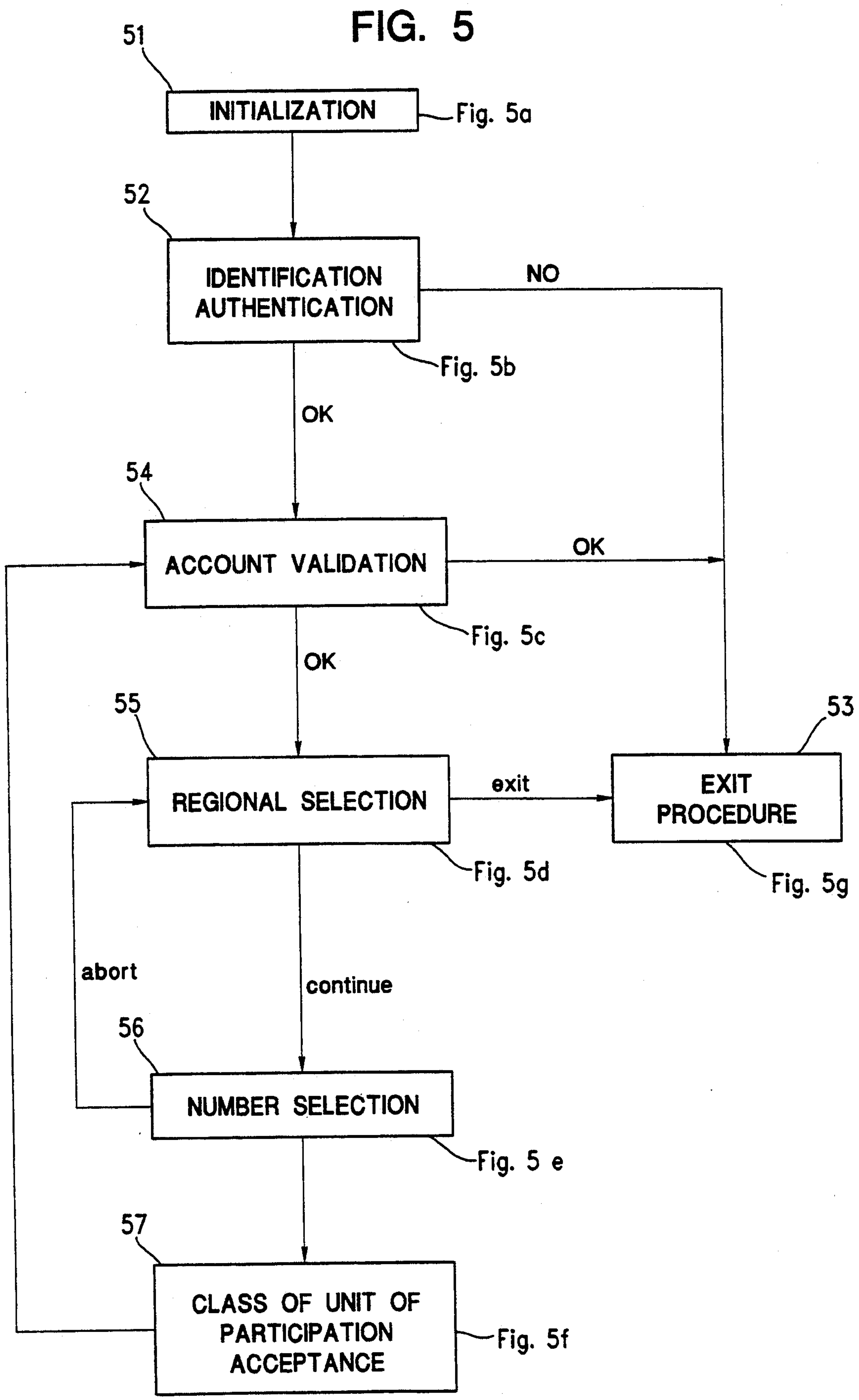
FIGS. 5–**5*g*** are a series of flow diagrams defining protocol usable in the initial Unit of Participation subscription or purchase request mode.
Figure 5B:
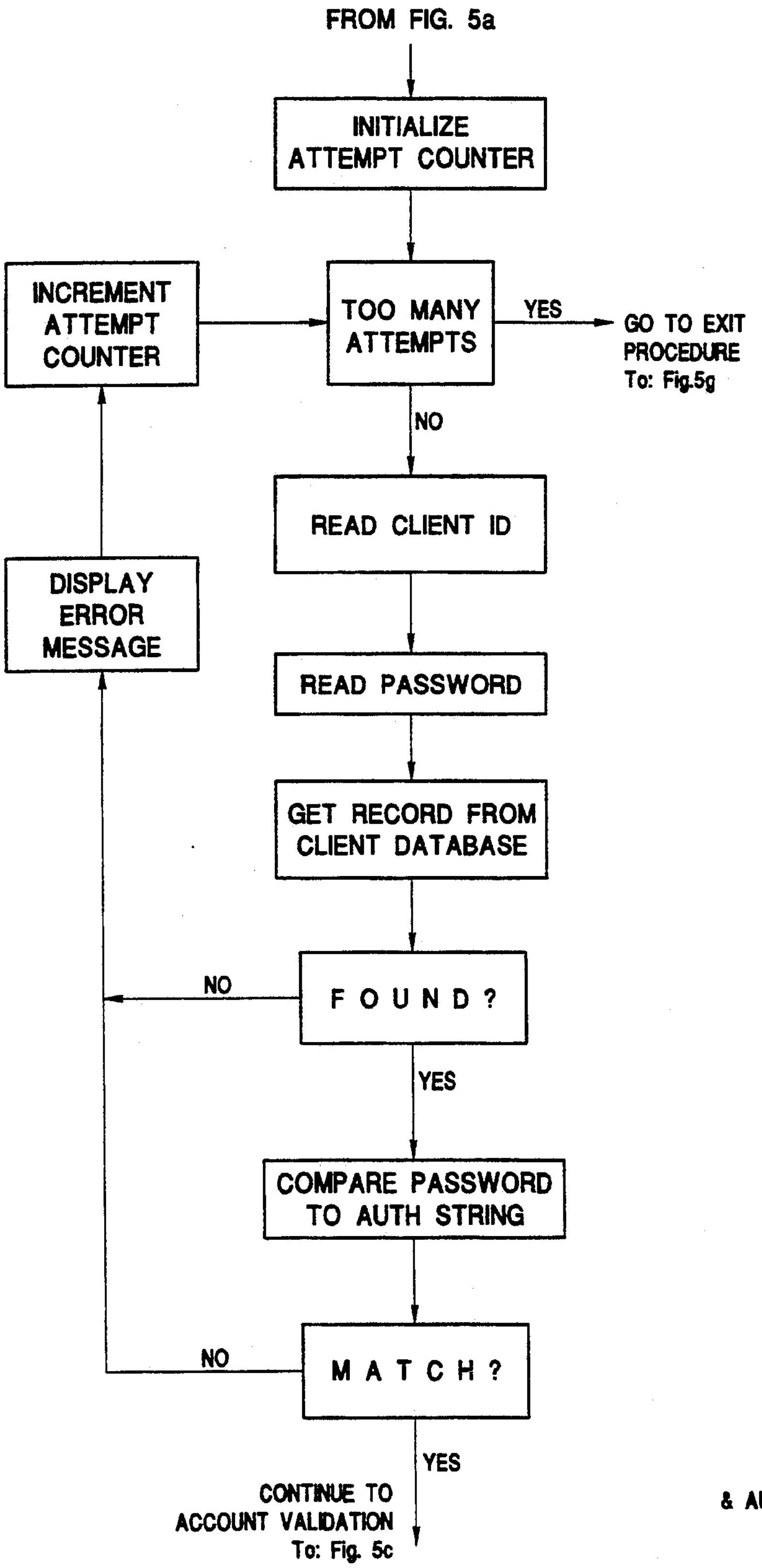

FIG. 5 represents a generalized flow diagram for initial subscription or purchase request intereraction between a client and the Central Control Unit.

Initialization #51 is made by a client by some type of communication to the Central Control Unit. Communication could be made by personal contact; telephone; key pad; or key board or some type of electric communication. This protocol is more fully disclosed in FIG. 5*a*.

Initial subscription or purchase request protocol may use two different data bases, the client database; and the class of Unit of Participation database.

The client database may include client identification data such as network account number and/or personal identification number and/or social security number. Deposit account number and credit balance data may also be included. The class of Unit of Participation database may include client identification; class of Unit of Participation; region; subscription serial number or other selected serial numbers on a per subscription or purchase basis; the date of the offering; and the expiration date.

The client is identified and authenticated, #52. This protocol is more fully disclosed in FIG. 5g. If identification and authentication is not satisfactory, the Central Control Unit goes into Exit Procedure #53. The flow diagram for Exit Procedure is more fully shown in FIG. 5g.

If identification and authentication #52 is approved then the Client's account is checked, #54. This protocol, set forth in FIG. 5c, may be used to determine if the clients account has the required liquid funds to fund complete subscription or purchase into each class of Unit of Participation.

The region selected #55, protocol permits the client to select the region in which the desired subscription or purchase is offered. This protocol is more fully described in FIG. 5d.

Number selection #56, permits the client to select the number or numbers required to make up one complete Unit of Participation in the class selected and in the region previously selected. FIG. 5e. explains this protocol.

Subscription or purchase into any class of Unit of Participation #57. protocol is a series of steps, which may be used for recording the subscription or purchase request and/or number or numbers required to make up one complete Unit of Participation; including the region in which the class of subscription or purchase is offered and the date on which the class of subscription or purchase is called or expires. Also included in this protocol is the debiting of the clients account for the cost of each complete class of Unit of Participation and any other accrued service fees. FIG. 5f more fully describes the protocol for subscription into any class of Unit of Participation.

Figure 5A:
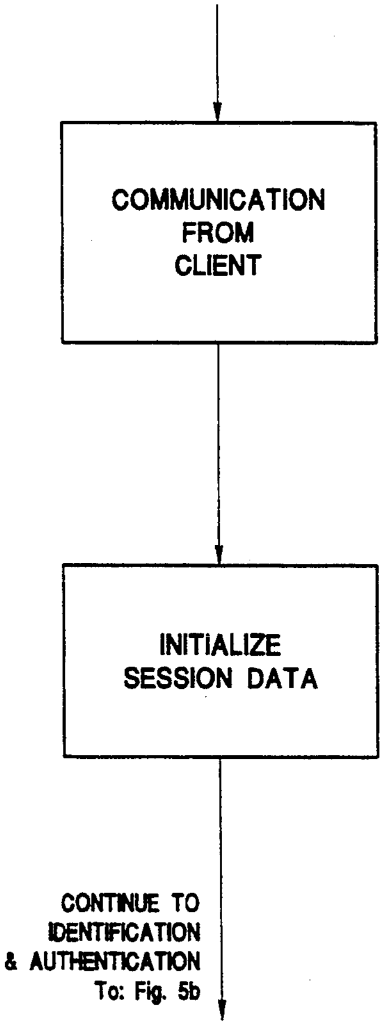
Figure 5C:
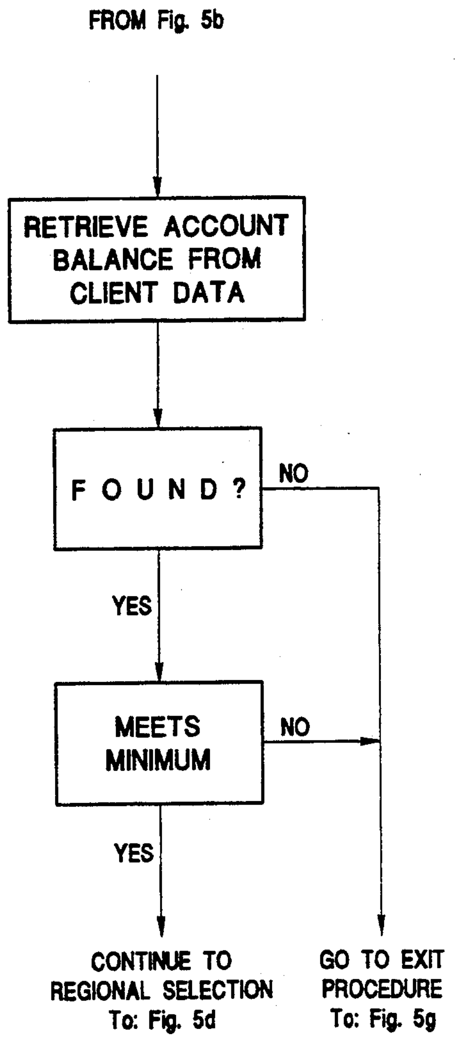
Figure 5D:
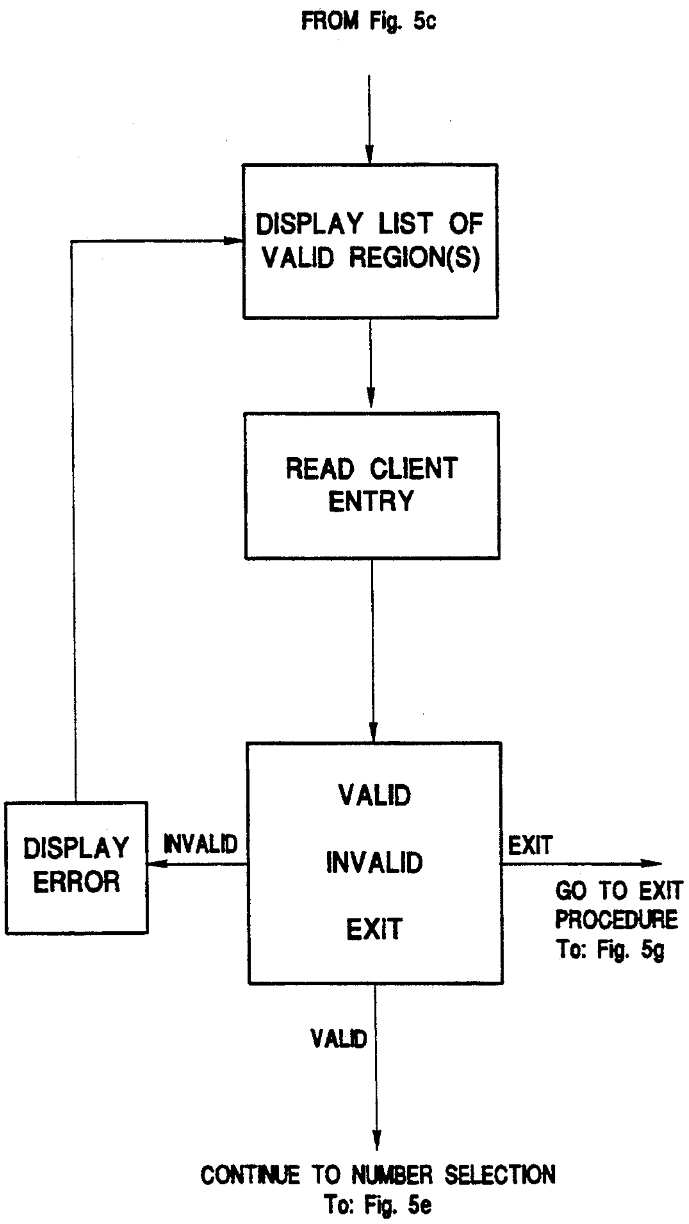
Figure 5E:
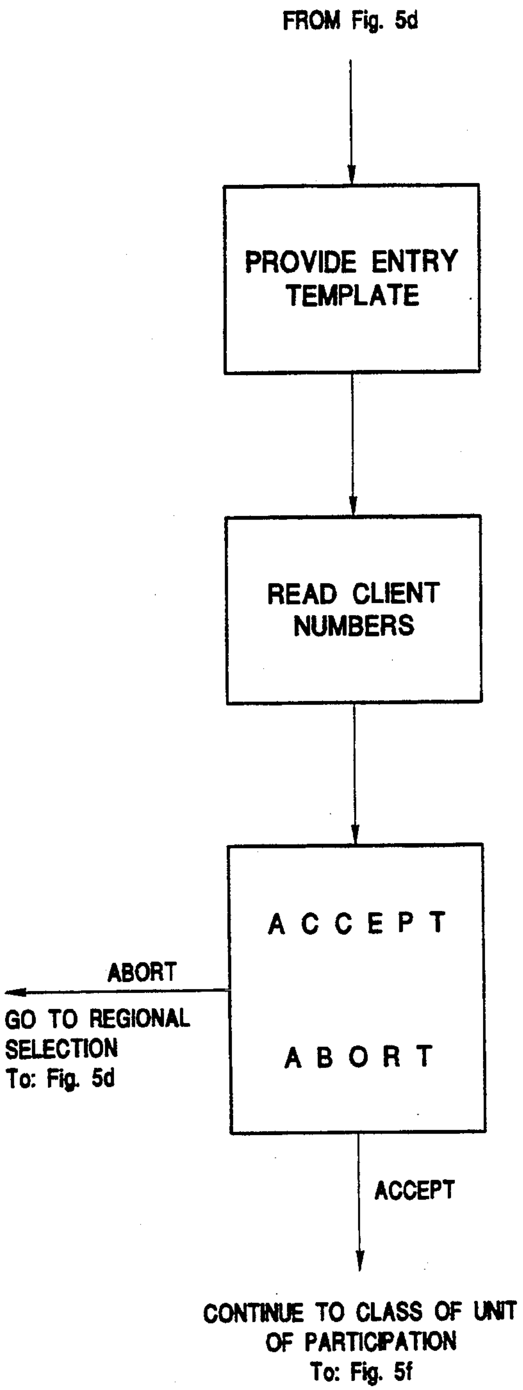
Figure 5F:
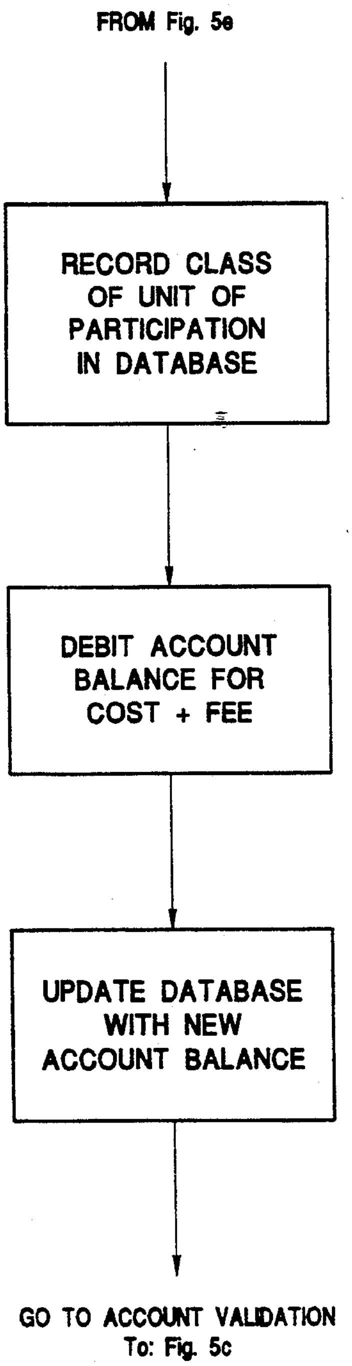
Figure 5G:
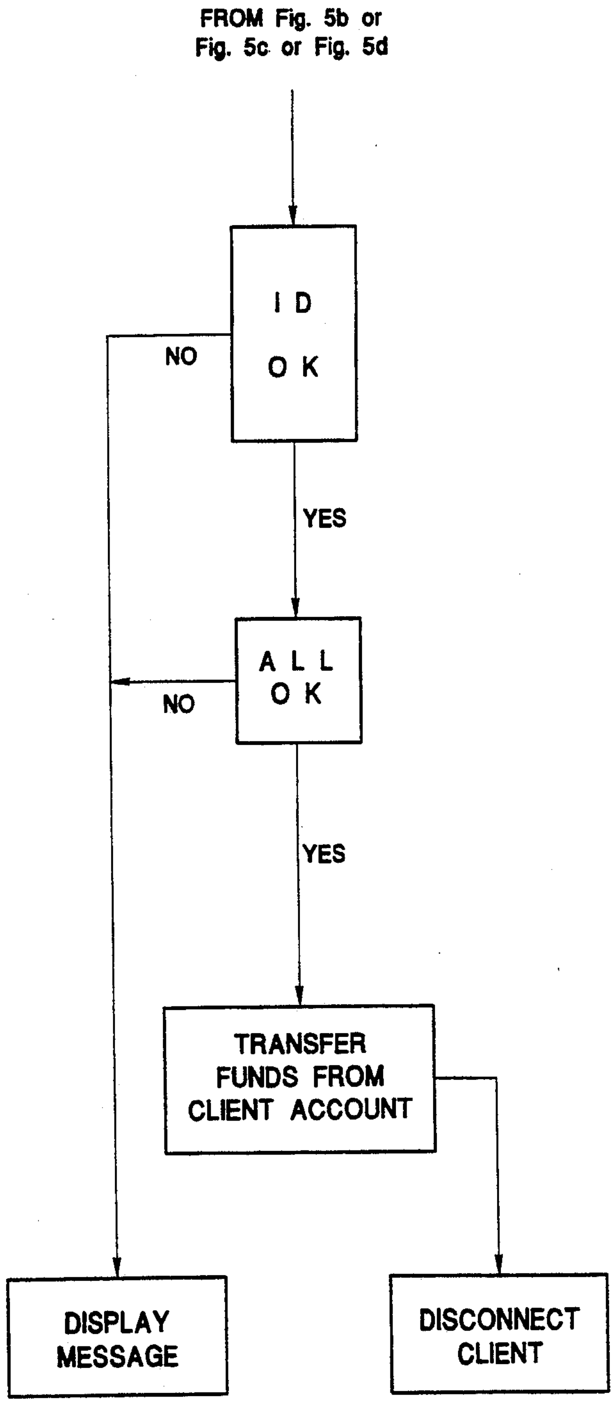

It is believed that the flow charts set forth in FIGS. 5a; 5b; 5c; 5d; 5e; 5f and 5g are self explanatory.

Figure 6:
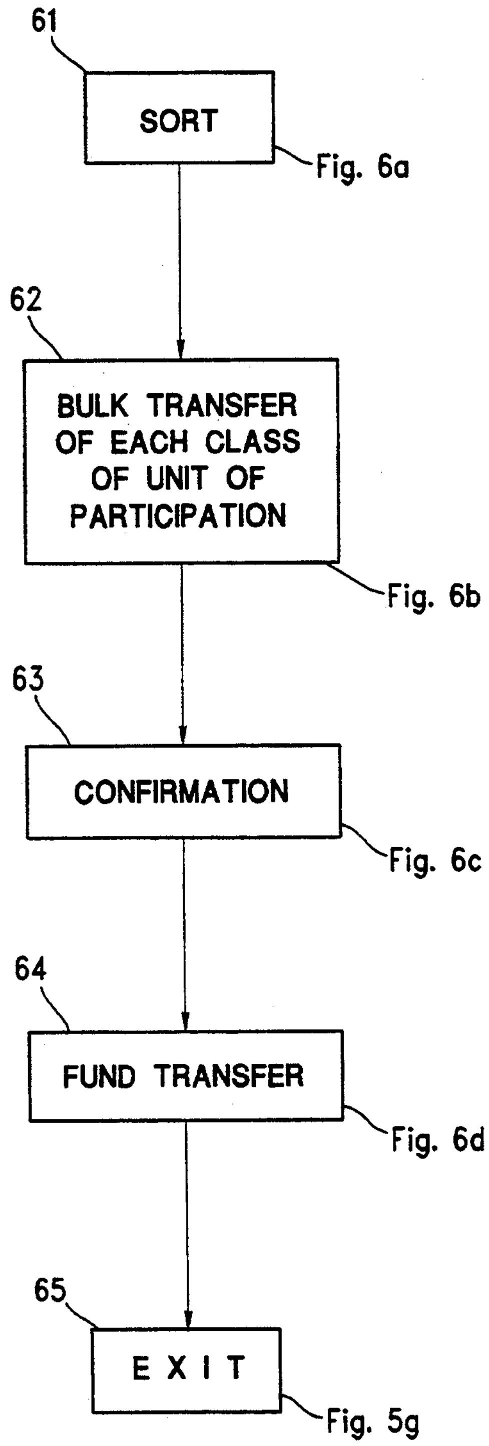
FIGS. 6–**6*d*** is a series of flow diagrams defining protocol usable in the Unit of Participation subscription purchase/settlement mode.
Figure 6A:
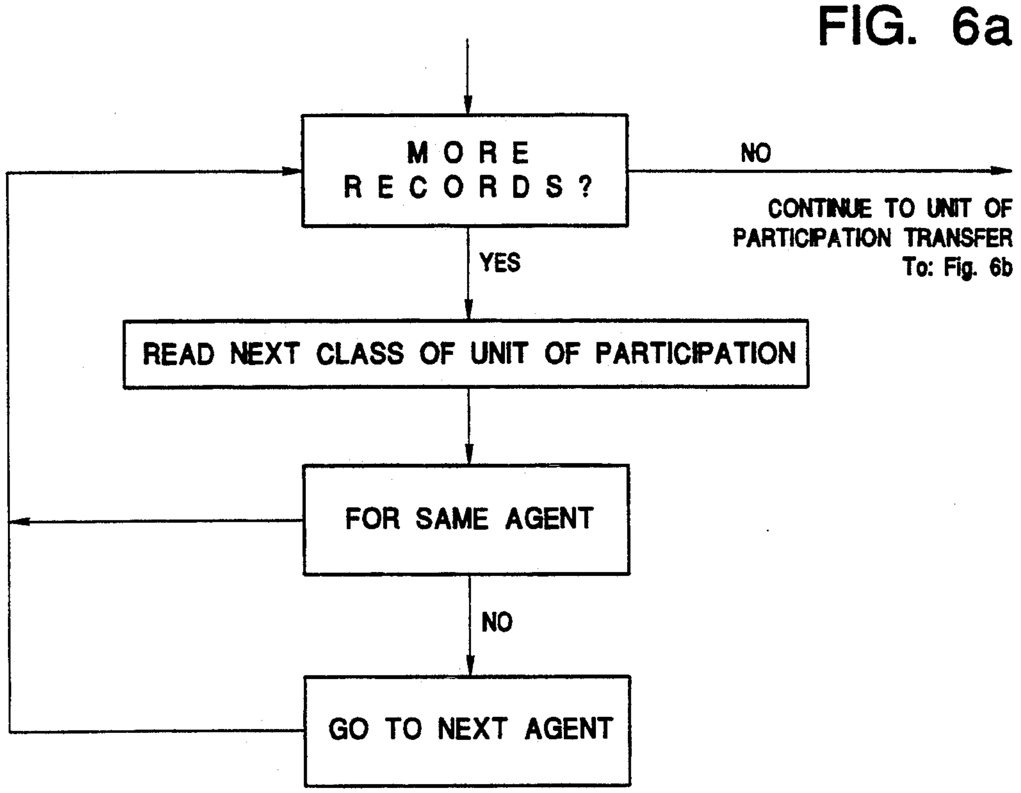

Registration of each complete class of Unit of Participation is generally set forth in the flow diagram in FIG. #6 with the general procedures more fully defined in FIGS. 6a; 6b; 6c and 6d.

Registration of each complete class of Unit of Participation involves communication between the Central Control Unit and one or more of the appointed agents located in the region in which the class of subscription or purchase selected is offered and available. The protocol involves withholding all client data and the transfer of bulk subscription or purchase data by class from the Central Control Unit Master Nominee Trust sector to the appointed Nominee of the regional Nominee Trust account, so that in effect the Regional Nominee Trustee is the nominated agent for the client and may subscribe or purchase in bulk into each or all classes of Units of Participation offered in that region on behalf of the client making the selection or selections.

The Sort Protocol #61, effectively sorts out within the assigned sorter database located within the Central Control Unit data that identifies each subscription or purchase to each class of Unit of Participation on an Agent; Trustee; or Nominee Trustee level; and a regional basis. The Class of offerings; subscription or purchase into offerings in each class of Unit of Participation and the cost data are sorted on a regional and Agent; or Trustee; or Nominee Trustee basis. This is shown in FIG. 6a.

Figure 6B:
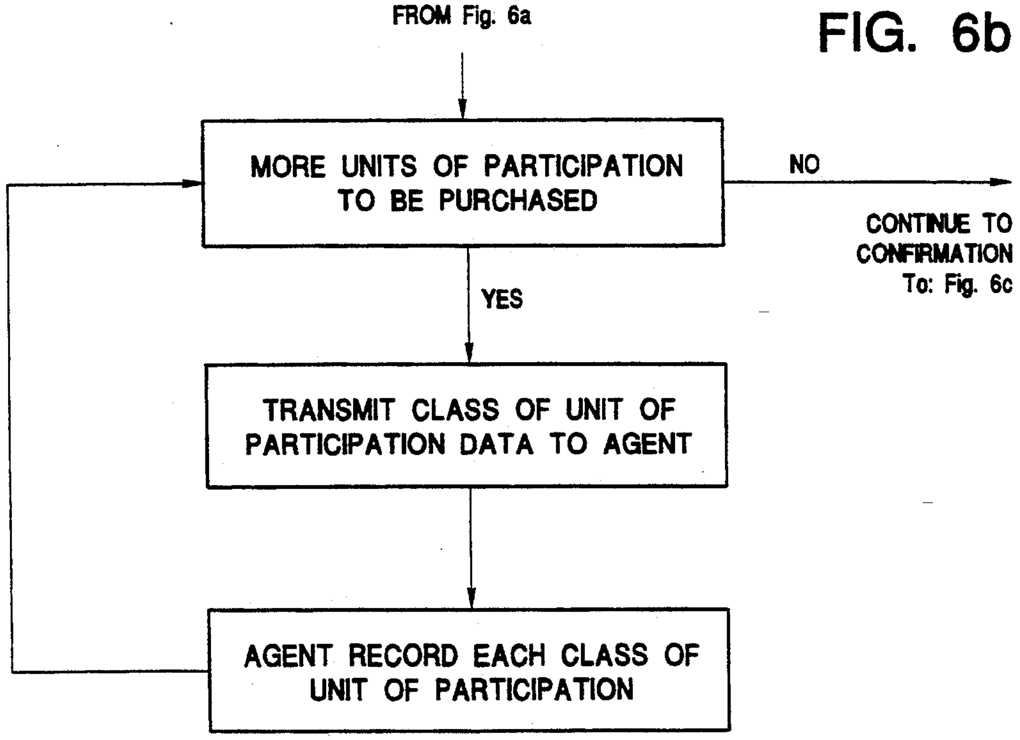
Figure 6C:
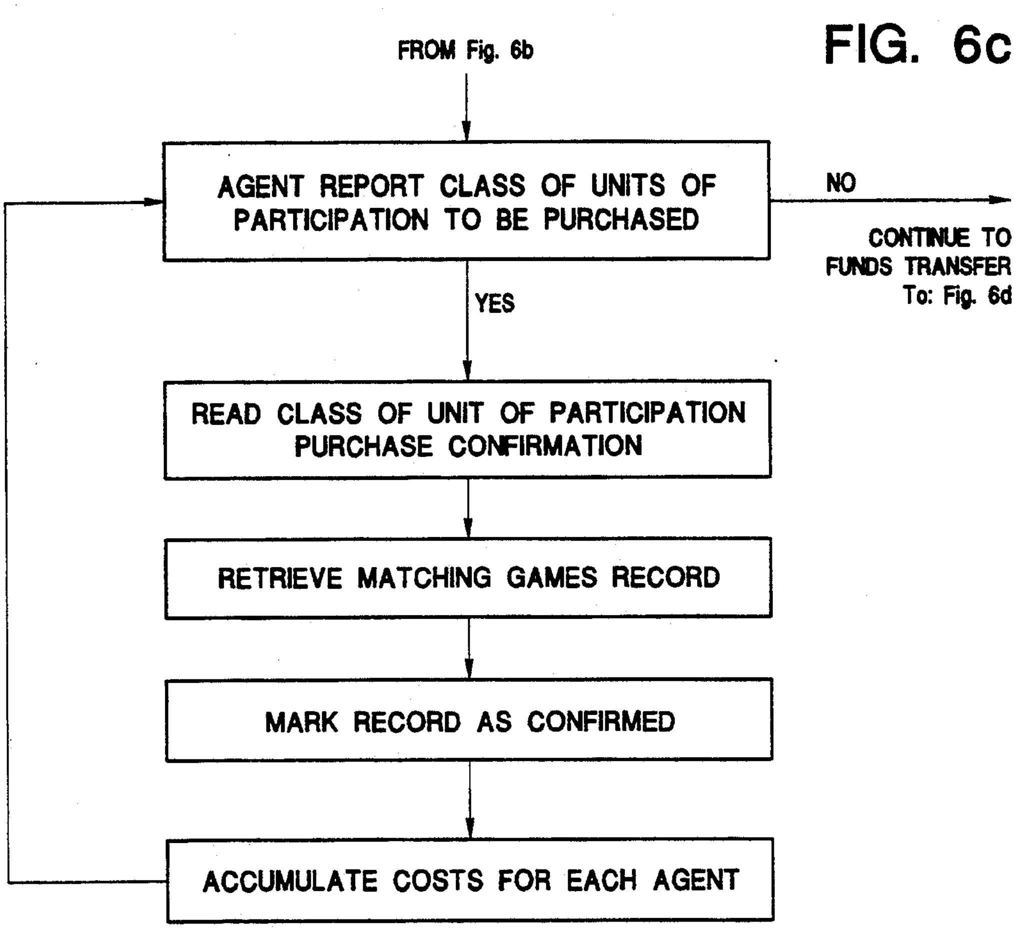

The bulk transfer of each class of Unit of Participation on a regional basis to the Agent; or Trustee; or Nominee Trustee #62 shown in FIG. 6b is recorded by each designated assignee. Confirmation #63 protocol is shown in FIG. 6c since it is appropriate for the Agent; or Trustee; or Nominee Trustee to confirm receipt of bulk subscriptions or purchases to each class of Unit of Participation and to acknowledge accurate execution with the Central Control Unit.

Figure 6D:
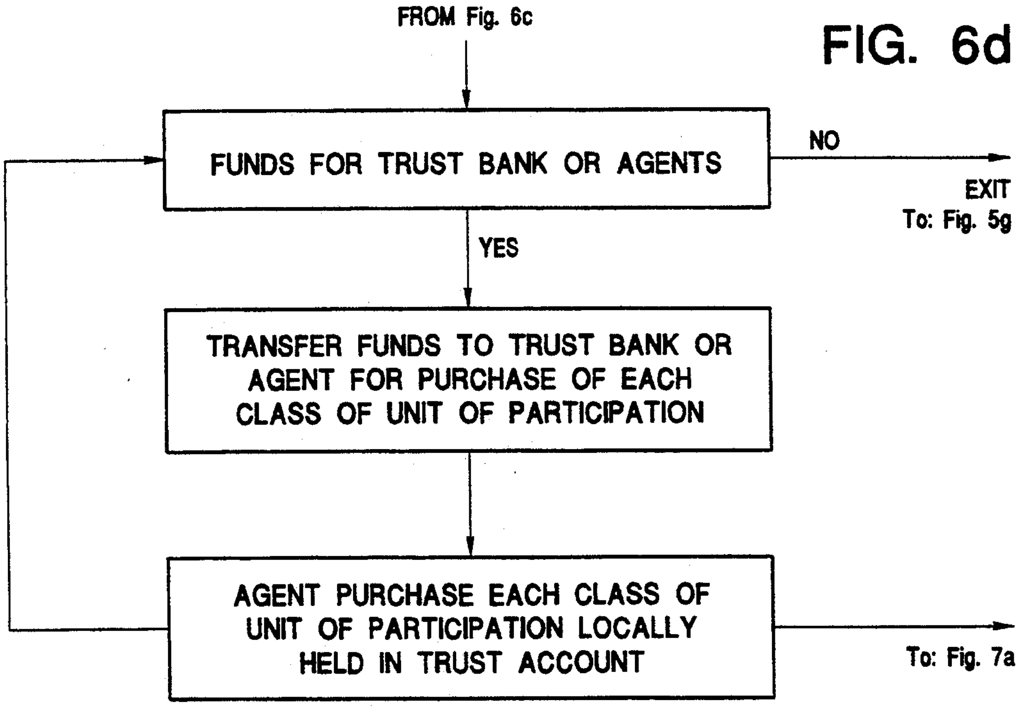

When the confirmation procedure is satisfactorily completed a transfer of funds #64 authorization is generated from the Central Control Unit to The Agent; or Trustee Bank; or Nominee Trust is made, as shown in FIG. 6d.

Subscription or purchase into each class of Unit of Participation that is ordered by the Central Control Unit is made locally and by the respective agent; or Trustee; or Nominee Trustee and paid or settled for by using funds transferred from the Central Control Unit It will be apparent that the opportunity to subscribe or purchase into any class of Unit of Participation, for the purpose of establishing ownership of record, hence the future right to claim, may be made available up to the deadline day, or time, or day and time, established by each issuer.

A right to claim protocol is set in motion on the designated day and time of expiration or soon thereafter; or as soon as it is universally known which group of subscription or purchase rights within any class of Unit of Precipitation have expired worthless and which group of subscription or purchase rights within any class of Unit of Participation own a continued right to exercise a claim for the guaranteed asset distribution.

It is believed that the flow diagrams set forth in FIGS. 6a; 6b; 6c; and 6d are self-explanatory.

Figure 7:
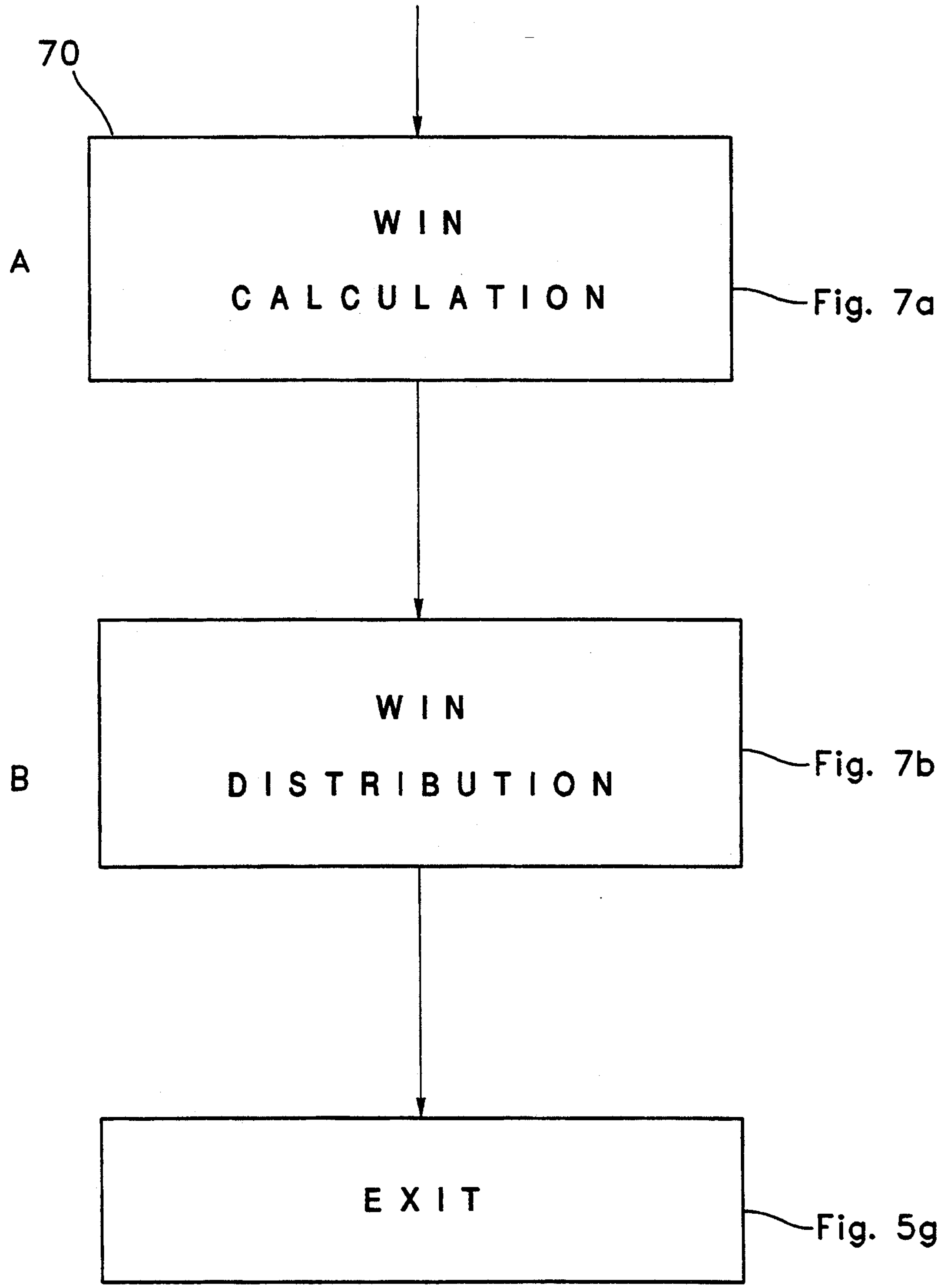
FIGS. 7–**7*b*** is a series of flow diagram defining a procedure usable in the class of Unit of Participation settlement mode.

FIG. 7 represents a general flow diagram of the claim for a guaranteed asset distribution protocol where winning data on each complete and fully funded subscription or purchase into one complete Unit of Participation guaranteeing the future right to claim must be verified by matching the unexpired combination data with the combination data in the subscription or purchase database. In order to cross check data for unexpired subscription or purchase rights in each class of Unit of Participation, the 'Unexpired Rights' verification search procedure, #70 is conducted both regionally and at the Central Control.

Figure 7A:
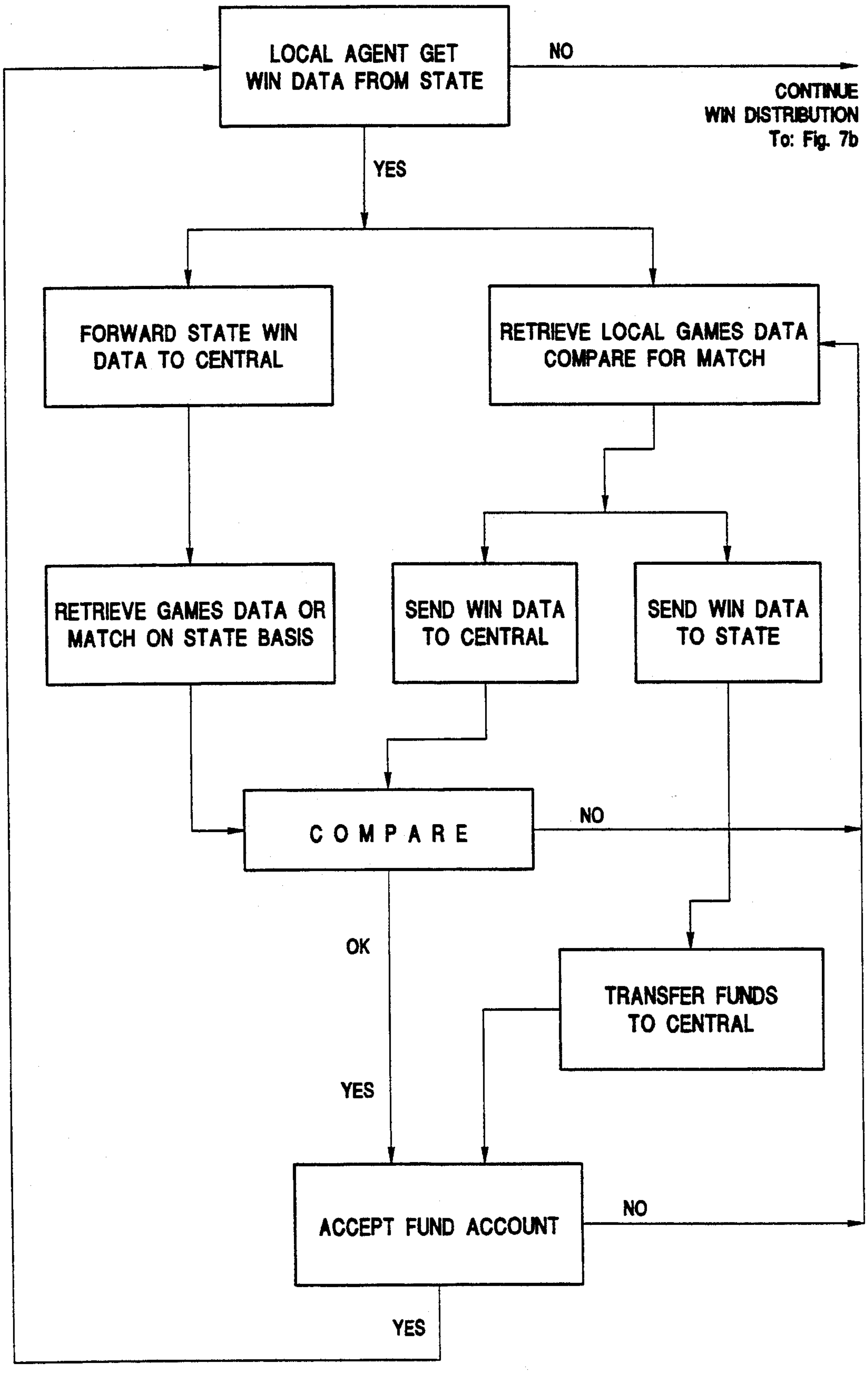

FIG. 7a shows a flow diagram that may be used for such a protocol.

Figure 7B:
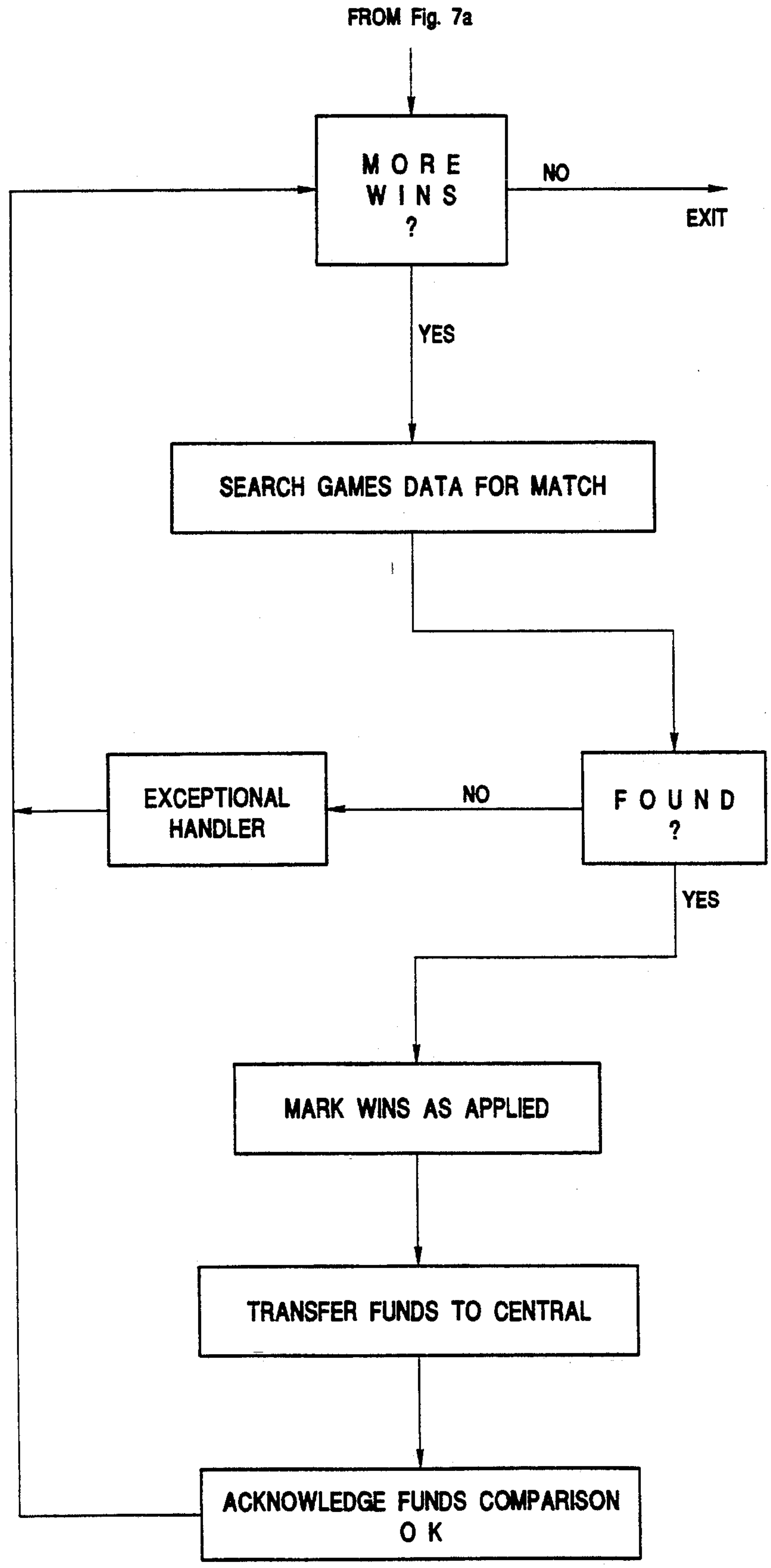

Distribution of a guaranteed asset for each unexpired right to claim in each class of Unit of Participation between each regional Agent; or Trustee; or Nominee Trustee and the Central Control Unit (interacting with the Master Nominee Trust) is accomplished after researching or rematching the subscription or purchase data for each class of Unit of Participation held in the Central Control Unit (interacting with the Master Nominee Trust). The procedure ensures that all unexpired rights to claim in each class of Unit of Participation are tendered to the issuer for guaranteed settlement. This procedure is shown in the flow diagram FIG. 7b.

The Agent or Trustee or Nominee Trustee is responsible for the tender, in any class and with a valid right to claim, to the issuer of all unexpired Units of Participation, the collection of assets guaranteed as settlement compensation from the issuer, forwarding such assets to the Central Control Unit (interacting with the Master Nominee Trust), where such assets will be distributed into the account, or transferred to the designated account of each owner of record of any class of unexpired Unit of Precipitation with the right to claim and guaranteed distribution.

Thus, there has been described a computerized network, or essentially a programmed electronic bulletin board providing programmed information that makes subscription or purchase into offerings of any class of Unit of Participation held remote from any subscriber by having a locally domiciled Agent; or Trustee; or Nominee Trustee subscribe or purchase and hold locally, each Unit of Participation, in each class; containing selected numbers, letters or combinations of numbers and letters, or the subscription or purchase and holding of a complete Unit of Participation or other indication of subscription or purchase participation in any class of Unit of Participation, for the benefit of a person remote from the region or municipality or legitimate operator or country foreign to the U.S. offering the subscription or purchase into or contest or other event.

A flow diagram has been shown carrying out a protocol accomplishing the objectives of the network. Changes and modifications may be made, in the invention as they become a apparent to those skilled in the art without departing from the spirit of the invention defined in the claims.

What is claimed is:

1. A computerized network for on-site purchase, holding and collection of a unit of participation of a game of chance, said game of chance held at a geographically remote location from the location of a person participating in said game of chance, said computerized network comprising:

a) a central control unit (CCU) including, i) a central processing unit (CPU) for controlling said CCU, ii) a first interface connected between said CPU and a player control unit and, a second interface connected between said CPU and an agent control unit, said first interface and said second interface isolated from each other, iii) a first means for receiving, storing and comparing identification data of a client of said computerized network, said first means connected to said CPU, iiii) a second means for receiving, storing and transmitting, connected to said CPU for receiving, storing and transmitting a game of chance data and a games data communicated between said CCU and said player control unit via said first interface and for receiving, storing and transmitting said game of chance data communicated between said CCU and said agent control unit, said game of chance data identifying said unit of participation of said game of chance to be purchased, held and collected by an on-site agent, geographically located where said game of chance is held and geographically remote from a client/player ordering said unit of participation.

2. A computerized network as in claim 1 and in which said game of chance data communicated between said CCU and said agent control unit is transmitted via said second interface and said games data, stored in said second means, is withheld from transmission to said agent control unit.

3. A computerized network as in claim 2 and in which said games data includes information on games of chance to be held, the region and/or facility holding such game of chance and the date and time such game of chance is to be held.

4. A computerized network as in claim 3 and in which said game of chance data communicated between said CCU and said player control unit includes information on said unit of participation of said game of chance in which said client/player wishes to participate.

5. A computerized network as in claim 4 and in which said game of chance data communicated between said CCU and said agent control unit includes information on said unit of participation of said game of chance in which said client/player wishes to participate and information on proceeds won by said unit of participation.

6. A computerized network for on-site purchase, holding and collection of a unit of participation of a game of chance held at a geographically remote location from the location of a person wishing to participate in said game of chance, said computerized network comprising:

a) a central control unit (CCU) including, i) a central processing unit for controlling said central control unit, ii) a first interface dedicated exclusively to communication between said central control unit and a client of said central control unit, said first interface connected to said central processor unit, iii) a second interface dedicated exclusively to communication between said central control unit and an agent of said central control unit said agent being located geographically remote from the geographical location of said client but on-site relative to the location of holding of said game of chance, iiii) an identification means for receiving, storing and comparing identification data on said client, said identification means connected to said central processor unit, and v) a games means for receiving, storing and transmitting a games data and a game of chance data, said games data including information on games of chance to be held, the region and/or facility holding such games of chance and the date and time said games of chance are to be held;

b) a player control means connected to said first interface for providing a communications link exclusively between said client and said central control unit for receiving games data for said client and for transmitting said game of chance data from said client to said central control unit.

7. A computerized network as in claim 6 and in which said game of chance data includes information on said unit of participation of said game of chance in which said client wishes to participate and said network further includes an agent control means connected to said second interface for providing a communications link between said agent and said central control unit for transmitting said game of chance data between said central control unit and said agent.

* * * * *